US010729259B2

(12) United States Patent
Brej

(10) Patent No.: US 10,729,259 B2
(45) Date of Patent: Aug. 4, 2020

(54) ACTUATOR WITH TIME DELAY

(71) Applicant: Fasteners for Retail, Inc., Twinsburg, OH (US)

(72) Inventor: Thaddeus Brej, Rocky River, OH (US)

(73) Assignee: Fasteners for Retail, Inc., Twinsburg, OH (US)

( * ) Notice: Subject to any disclaimer, the term of this patent is extended or adjusted under 35 U.S.C. 154(b) by 27 days.

(21) Appl. No.: 16/158,166

(22) Filed: Oct. 11, 2018

(65) Prior Publication Data

US 2019/0038049 A1    Feb. 7, 2019

Related U.S. Application Data

(63) Continuation of application No. 15/460,744, filed on Mar. 16, 2017, now Pat. No. 10,111,540.

(60) Provisional application No. 62/309,787, filed on Mar. 17, 2016.

(51) Int. Cl.
*A47F 5/08* (2006.01)
*A47F 1/12* (2006.01)
*F16H 27/08* (2006.01)

(52) U.S. Cl.
CPC ............ *A47F 5/0861* (2013.01); *A47F 1/128* (2013.01); *F16H 27/08* (2013.01)

(58) Field of Classification Search
CPC .......... A47F 5/0861; A47F 1/128; F16H 27/08
USPC ....................................................... 221/1, 15
See application file for complete search history.

(56) References Cited

U.S. PATENT DOCUMENTS

| | | | |
|---|---|---|---|
| 5,400,919 A | 3/1995 | Gomm et al. | |
| 6,230,932 B1 * | 5/2001 | Lowing | G07F 11/045 221/191 |
| 7,533,784 B2 * | 5/2009 | Vlastakis | A47F 5/0861 221/151 |
| 7,559,437 B2 * | 7/2009 | Colelli | G07F 11/24 221/312 A |
| 7,641,072 B1 | 1/2010 | Vlastakis et al. | |
| D638,882 S * | 5/2011 | Smith, III | D20/8 |
| D661,919 S * | 6/2012 | Hester | D6/407 |
| 8,386,074 B2 * | 2/2013 | Smith, III | G07F 11/10 700/236 |
| 8,523,012 B2 * | 9/2013 | Richardson | A47F 5/0861 211/51 |
| 8,602,224 B2 | 12/2013 | Casey | |

(Continued)

OTHER PUBLICATIONS

Non-Final Office Action dated Feb. 20, 2018, by the U.S. Patent and Trademark Office relating to U.S. Appl. No. 15/460,744.

*Primary Examiner* — Rakesh Kumar

(57) ABSTRACT

A product-dispensing device includes a housing, an actuator, and a time delay mechanism. The actuator is supported by the housing for rotation about a first axis. The time delay mechanism is operably coupled to the actuator and includes a first gear, a second gear, a damper, and a biasing member. The first gear is fixed for rotation with the actuator. The second gear is supported by the housing for rotation about a second axis and configured to engage the first gear. The first gear is operable to rotate the second gear in a first direction about the second axis. The biasing member is operable to rotate the second gear in a second direction about the second axis. The damper is operable to control a rate of rotation of the second gear in the second direction about the second axis. The second direction is opposite the first direction.

20 Claims, 5 Drawing Sheets

(56) References Cited

U.S. PATENT DOCUMENTS

| | | | |
|---|---|---|---|
| 8,657,154 B2* | 2/2014 | Obitts | G07F 9/10 |
| | | | 211/59.2 |
| 8,684,227 B2* | 4/2014 | Richardson | A47F 5/0861 |
| | | | 211/51 |
| 8,788,091 B2 | 7/2014 | Bauer | |
| 9,078,532 B1* | 7/2015 | McHatet | E05B 73/00 |
| 9,214,054 B2* | 12/2015 | Chen | G07F 11/42 |
| 9,254,049 B2* | 2/2016 | Nagel | A47F 1/04 |
| 2004/0245263 A1* | 12/2004 | Bartholomew | B01F 13/1061 |
| | | | 221/1 |
| 2005/0029278 A1* | 2/2005 | Hara | G07F 11/72 |
| | | | 221/32 |
| 2011/0036789 A1* | 2/2011 | Richardson | A47F 5/0861 |
| | | | 211/1.57 |
| 2011/0127225 A1* | 6/2011 | Hooks, Jr. | A47F 5/0861 |
| | | | 211/1.57 |
| 2012/0253508 A1 | 10/2012 | Holmes | |
| 2014/0000323 A1* | 1/2014 | Kologe | A47F 5/0861 |
| | | | 70/58 |
| 2014/0352372 A1* | 12/2014 | Grant | A47F 5/0861 |
| | | | 70/57.1 |
| 2015/0096998 A1* | 4/2015 | Bird | A47F 1/128 |
| | | | 221/1 |
| 2019/0038049 A1* | 2/2019 | Brej | A47F 1/128 |

* cited by examiner

ACTUATOR WITH TIME DELAY

CROSS REFERENCE TO RELATED APPLICATIONS

This U.S. patent application is a continuation of U.S. Pat. No. 15/460,744, now U.S. Patent No. 10,111,540, filed on Mar. 16, 2017, which claims priority under 35 U.S.C. § 119(e) to U.S. Provisional Application 62/309,787, filed on Mar. 17, 2016, the entire disclosures of which are considered part of the disclosure of this application and are hereby incorporated by reference in their entirety.

FIELD

The present disclosure relates generally to theft deterrent devices for dispensing products. More specifically, the disclosure relates to dispensing devices which incorporate a theft deterrent actuator structure which allows for the removal of one item from a display device, but prevents the removal of additional items for a predetermined length or period of time.

BACKGROUND

This section provides background information related to the present disclosure and is not necessarily prior art.

Peg hooks or display hooks are commonly used in retail stores for displaying merchandise. Several identical items can be hung on a single hook to display such items for sale. This display method has several advantages, including allowing continuous viewing of the item. When the front item is removed from the hook, the next item becomes visible. Such hook displays are advantageous because they can be adapted to various display configurations as the hooks can be moved around by the merchant on a supporting peg board wall as desired. One disadvantage of such hooks however is that they allow thieves to easily take as many items from the hooks as they wish in a very short period of time. The taking of many or all of the in-stock items of a particular product by thieves (commonly referred to as "sweeping") is a major problem in the retail industry.

It is known to provide a support rod of a merchandise display hook which supports high risk merchandise with a series of S bends adjacent the free end of the support to prevent a shoplifter from easily "sweeping" all of the items off the display hook. Further, it is known to provide the display hook with a locking device configured to be positioned on the support rod between the free end of the rod and the forwardmost item of merchandise. One disadvantage of an anti-sweep locking device is that it requires a special key and assistance from sales personnel in order to allow a purchaser to take an item supported on the hook. A disadvantage of the use of S bends adjacent the free end of the display hook is that it makes it difficult for potential customers to remove items from the display hook and may dissuade potential customers from removing products held on such hooks.

It is also known to provide a mechanical time delay mechanism adjacent the free end of the support rod in order to increase the time required to dispense each item of merchandise from the display hook. However, there exists a need for a merchandise display structure having a mechanical time delay mechanism such as a knob or the like that is not exceedingly complex, costly or subject to malfunction. In other words, there exists a need for a better time delay mechanism which readily allows the dispensing of one item from a hook or like display structure, but retards the ability of the person removing the first item from removing additional items from the hook until a certain period of time has passed. There also exists a need to allow a rapid restocking of the items on the hook by a merchant without disabling the time delay mechanism.

SUMMARY

This section provides a general summary of the disclosure, and is not a comprehensive disclosure of its full scope or all of its features.

One aspect of the disclosure provides an actuator for a support structure for displaying merchandise. In some implementations, the actuator includes a control knob that is rotatable relative to a support member to allow removal of an item from the support member but which restricts the ability of further items to be removed from the support member for a predetermined period of time.

Another aspect of the present disclosure provides a product-dispensing device. The product-dispensing device may include a housing, an actuator, and a time delay mechanism. The actuator may be supported by the housing for rotation about a first axis. The time delay mechanism may be operably coupled to the actuator and may include a first gear, a second gear, a damper, and a biasing member. The first gear may be fixed for rotation with the actuator. The second gear may be supported by the housing for rotation about a second axis and may be configured to engage the first gear. The first gear may be operable to rotate the second gear in a first direction about the second axis. The biasing member may be operable to rotate the second gear in a second direction about the second axis. The damper may be operable to control a rate of rotation of the second gear in the second direction about the second axis. The second direction may be opposite the first direction.

Implementations of the disclosure may include one or more of the following optional features.

In some implementations, the product-dispensing device includes an outer knob supported by the actuator. The outer knob may be operable to rotate with the actuator in the second direction about the first axis and operable to rotate independently of the actuator in the first direction about the first axis.

In some implementations, the product-dispensing device includes a product dispensing coil coupled to the outer knob for rotation therewith. The outer knob may include a first ratcheting feature, and the actuator may include a second ratcheting feature configured to engage the first ratcheting feature upon rotation of the outer knob about the first axis.

In some implementations, the time delay mechanism includes a signaling wheel fixed for rotation with the second gear about the second axis. The signaling wheel may have a circular outer wall defining a recessed area offset from the second axis. The actuator may have a protrusion operably received by the recessed area in a first mode of operation.

In some implementations, the second gear includes a rim having an opening aligned with the recessed area. The protrusion may be operable to engage the rim in a second mode of operation.

In some implementations, the rim is operable to prevent rotation of the actuator about the first axis in the second mode of operation.

In some implementations, the housing includes a first side defining an annular recess operable to translatably receive the protrusion, and a second side defining a circular recess operable to rotatably receive the signaling wheel. The annular recess may define a slot aligned with the opening of the second gear and the recessed area of the signaling wheel.

In some implementations, the biasing member is operable to store potential energy upon rotation of the second gear in the first direction about the second axis Another aspect of the disclosure provides a product-dispensing device. The product-dispensing device may include a housing, a first gear, a product dispensing coil, a biasing member, and a damper. The first gear may be supported by the housing for rotation about a first axis. The product dispensing coil may be operably coupled to the first gear for rotation about the first axis. The second gear may be operable to engage the first gear and may be supported by the housing for rotation about a second axis offset from the first axis. The biasing member may be operable to bias the second gear in a first direction about the second axis. The damper may be operable to control a rate of rotation of the second gear in the first direction about the second axis.

This aspect may include one or more of the following optional features.

In some implementations, the first gear is operable to rotate the second gear in a second direction about the second axis.

In some implementations, the product-dispensing device includes an outer knob operable to rotate with the first gear in the first direction about the first axis and operable to rotate independently of the first gear in the second direction about the first axis.

In some implementations, the product-dispensing device includes an actuator and a signaling wheel. The actuator may be coupled to the first gear for rotation about the first axis, and may include a protrusion offset from the first axis. The signaling wheel may be fixed for rotation with the second gear about the second axis. The signaling wheel may include a circular outer wall defining a recessed area offset from the second axis. The recessed area may be configured to receive the protrusion.

In some implementations, the second gear includes a rim having an opening aligned with the recessed area. The protrusion may be operable to engage the rim to prevent rotation of the actuator about the first axis.

In some implementations, the housing includes a first side defining an annular recess operable to translatably receive the protrusion, and a second side defining a circular recess operable to rotatably receive the signaling wheel. The annular recess may define a slot aligned with the recessed area of the signaling wheel.

In some implementations, the biasing member is operable to store potential energy upon rotation of the second gear in the second direction about the second axis.

Yet another aspect of the disclosure provides a product-dispensing device. The product-dispensing device may include a housing, an actuator, a first gear, a second gear, a biasing member, and a damper. The housing may include a first side and a second side opposite the first side. The first side may define an annular recess. The second side may define a circular recess. The housing may further include an opening aligned with the annular recess and the circular recess. The actuator may be supported by the housing for rotation about a first axis. The actuator may include a protrusion translatably received by the annular recess. The first gear may be coupled to the actuator for rotation about the first axis. The second gear may be operably coupled to the first gear and disposed within the circular recess for rotation about a second axis. The second gear may include a peripheral wall defining an opening configured to receive the protrusion. The biasing member may be operably coupled to the second gear and configured to rotate the second gear in a first direction about the second axis. The damper may be operably coupled to the second gear and configured to control a rate of rotation of the second gear in the first direction about the second axis.

In some implementations, the product-dispensing device includes a product dispensing coil operably coupled to the first gear for rotation about the first axis.

In some implementations, the first gear includes a first arcuate peripheral wall extending between a first pair of gear teeth, and the second gear includes a second arcuate peripheral wall extending between a second pair of gear teeth. In some implementations, the second gear is operable to rotate independently of the first gear when the first arcuate peripheral wall is aligned with the second arcuate peripheral wall.

In some implementations, the product-dispensing device includes an outer knob supported by the actuator. The outer knob may be operable to rotate with the actuator in a second direction about the first axis and operable to rotate independently of the actuator in the first direction about the first axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
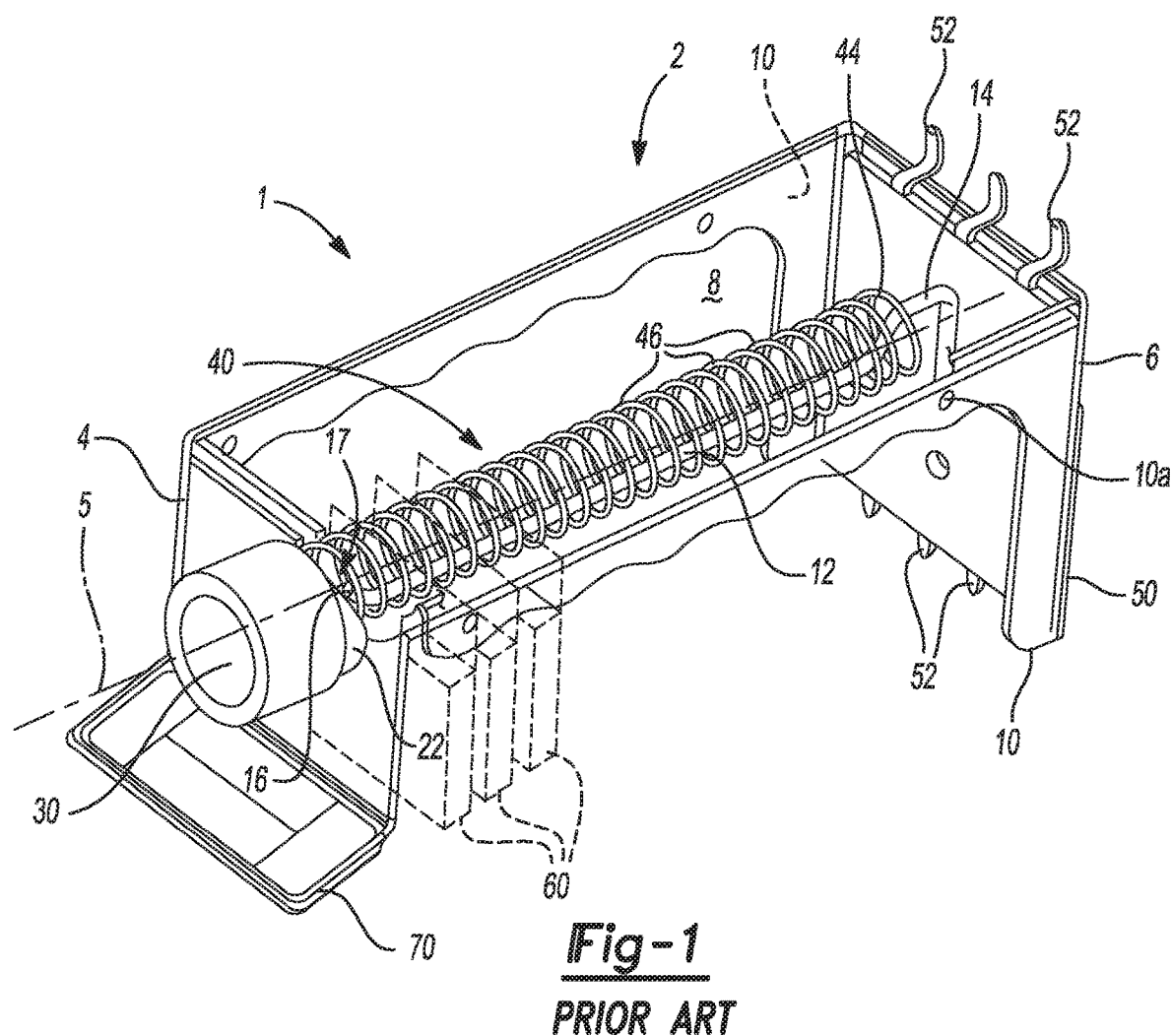
FIG. 1 is a perspective view of an apparatus showing packages of merchandise as mounted on a support rod employing an actuator according to the prior art.

Referring now to the drawings wherein the showings are for purposes of illustrating configurations of the present disclosure and not for purposes of limiting same. FIG. 1 shows a merchandise dispenser according to the prior art and FIGS. 2-5 show an actuator mechanism according to the present disclosure.

With reference now to FIG. 1, a merchandise dispenser 1 with a coil actuation is employed for use in a retail store environment to dispense merchandise. The apparatus comprises a housing or chassis 2 including a front wall 4, a rear wall 6, a top wall 8, and side wall panels 10. In some implementations, at least some of the wall panels of the housing 2 can be made out of a transparent material, such as a known type of plastic. This allows for easy visibility of merchandise 60 which is supported in the housing. The merchandise may comprise one or more packages. The packages can be located adjacent the front end 4 of the housing so as to be readily accessible by potential customers. The dispenser includes a support rod 12 around which is mounted a helical coil 40. Both the rod and the coil can be aligned along a common axis 5. It should be apparent from FIG. 1 that the helical coil 40 includes a series of spiraling coil sections 46 extending longitudinally along the axis 5. It should also be apparent from FIG. 1 that the side wall panels 10 are cut out so that access can be had to the sides of the packages 60. However, no access is allowed to the tops of the packages due to the presence of the top wall 8. The housing 2 can be mounted on a peg board or like support device by one or more L-shaped fingers 52.

A distal end 14 of the rod 12 is engaged with the rear panel 6 and is mounted thereto. In some implementations, the distal end 14 can be L-shaped so that it can be welded to the rear panel 6 if the support rod and at least the rear wall panel 6 are made of a metal. Alternatively, the rear end of the rod may be secured in a slot (not shown) in the rear panel. The rod 12 extends forwardly from the rear panel and terminates at a free end 16 which is located near the front panel 4. In some implementations, a free end 16 of the rod is angled upwardly so as to retard merchandise 60 from falling off the rod until it is pushed off the free end of the rod by the rotation of the coil 40. A knob 30 is rotatably mounted to the front panel 4. The knob is connected to a proximal end of the coil 40 so that rotation of the knob rotates the coil 40 about the common axis 5. Further information concerning the merchandise dispenser discussed above can be found in U.S. Pat. No. 7,559,437 which issued on Jul. 14, 2009 and is incorporated hereinto by reference in its entirety.

Figure 2:
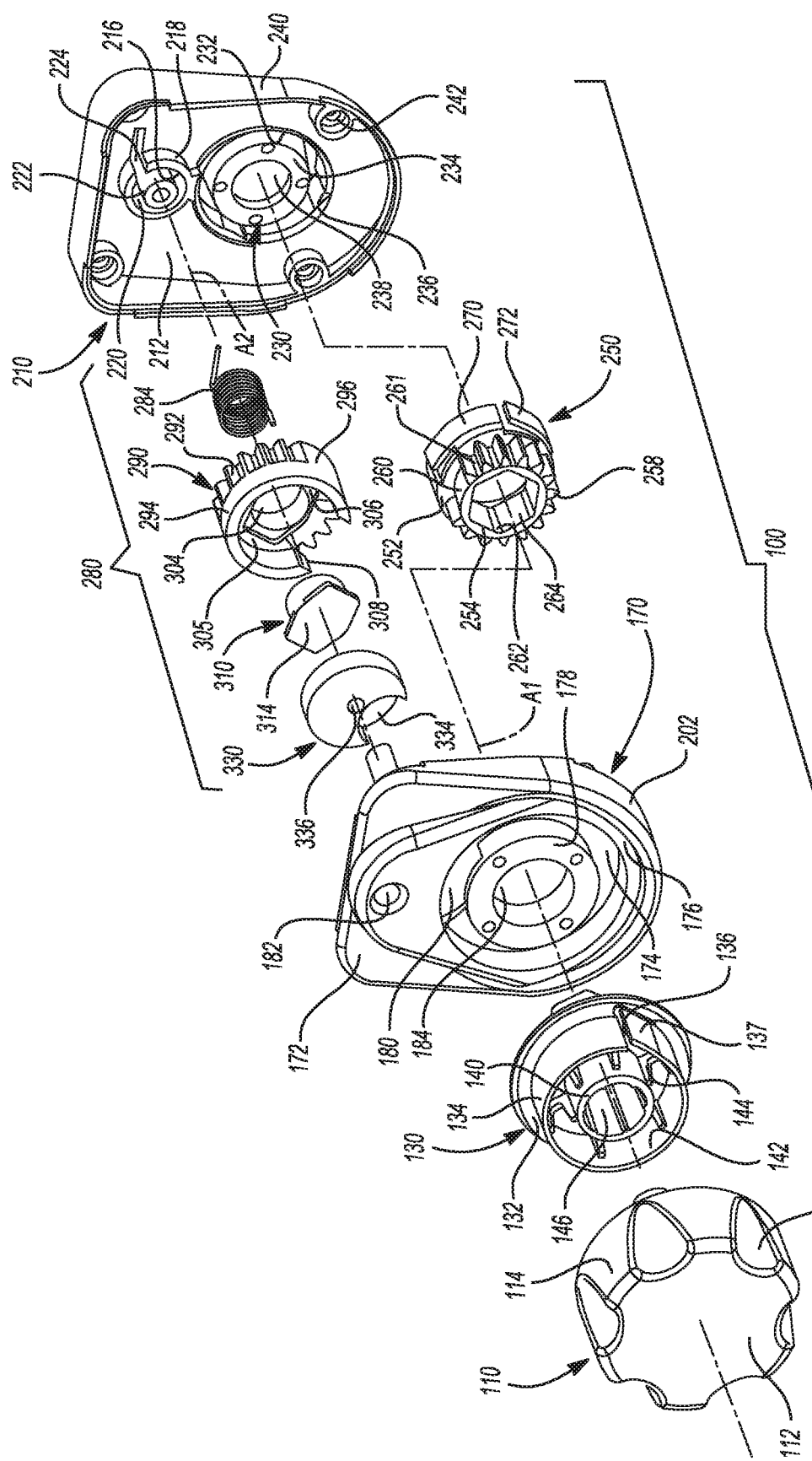
FIG. 2 is an exploded front perspective view of a time delay actuator in accordance with the principles of the present disclosure.

With reference now to FIG. 2, an actuator 100 according to the present disclosure can be employed with the merchandise dispenser 1 in place of the knob 30 illustrated in FIG. 1. The actuator 100 may include an outer knob section 110, an inner knob section or actuator part 130, a housing 160 (FIG. 5), and a time delay mechanism 280.

Figure 3:
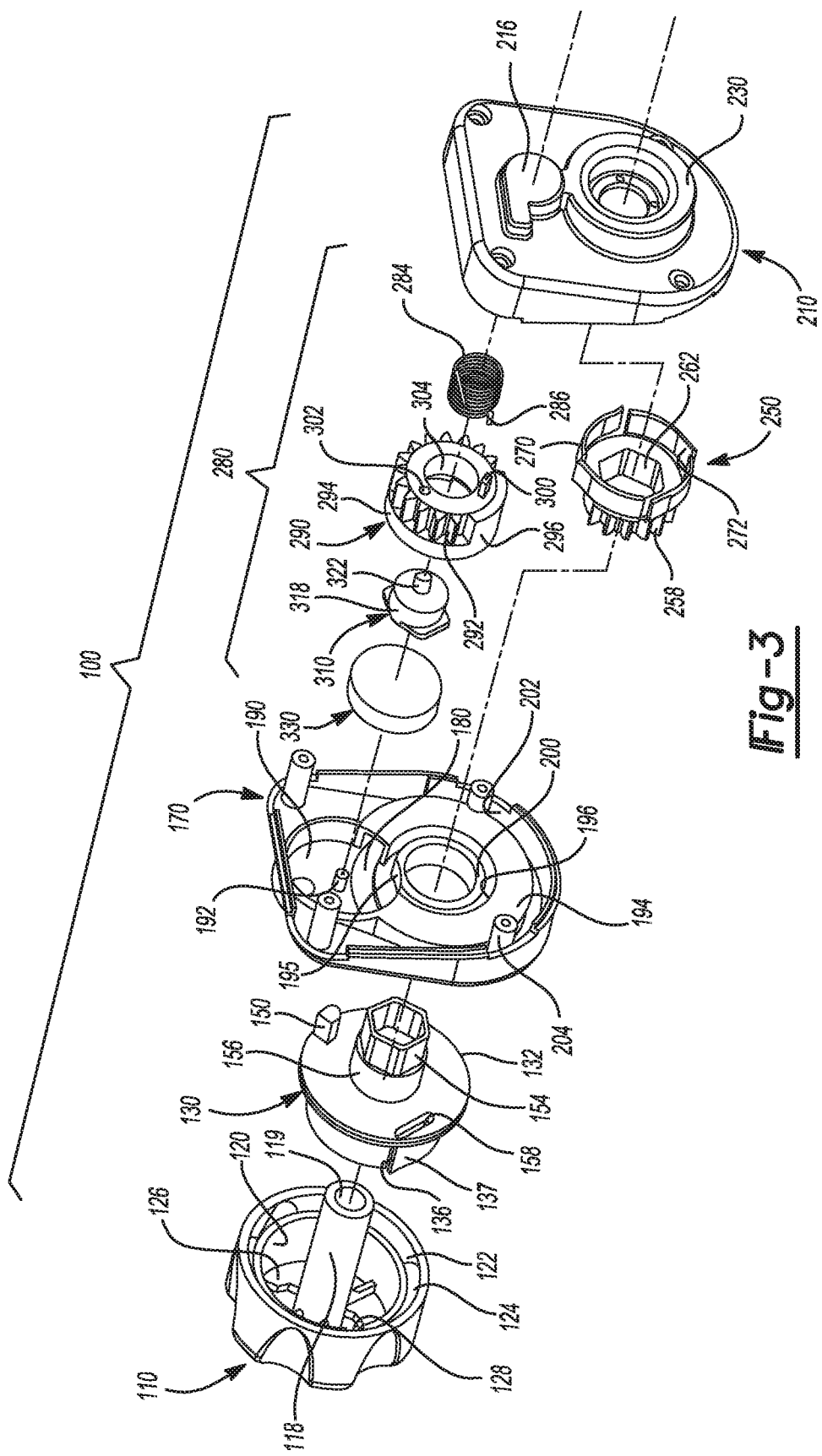
FIG. 3 is an exploded rear perspective view of the actuator of FIG. 2.
Figure 4:
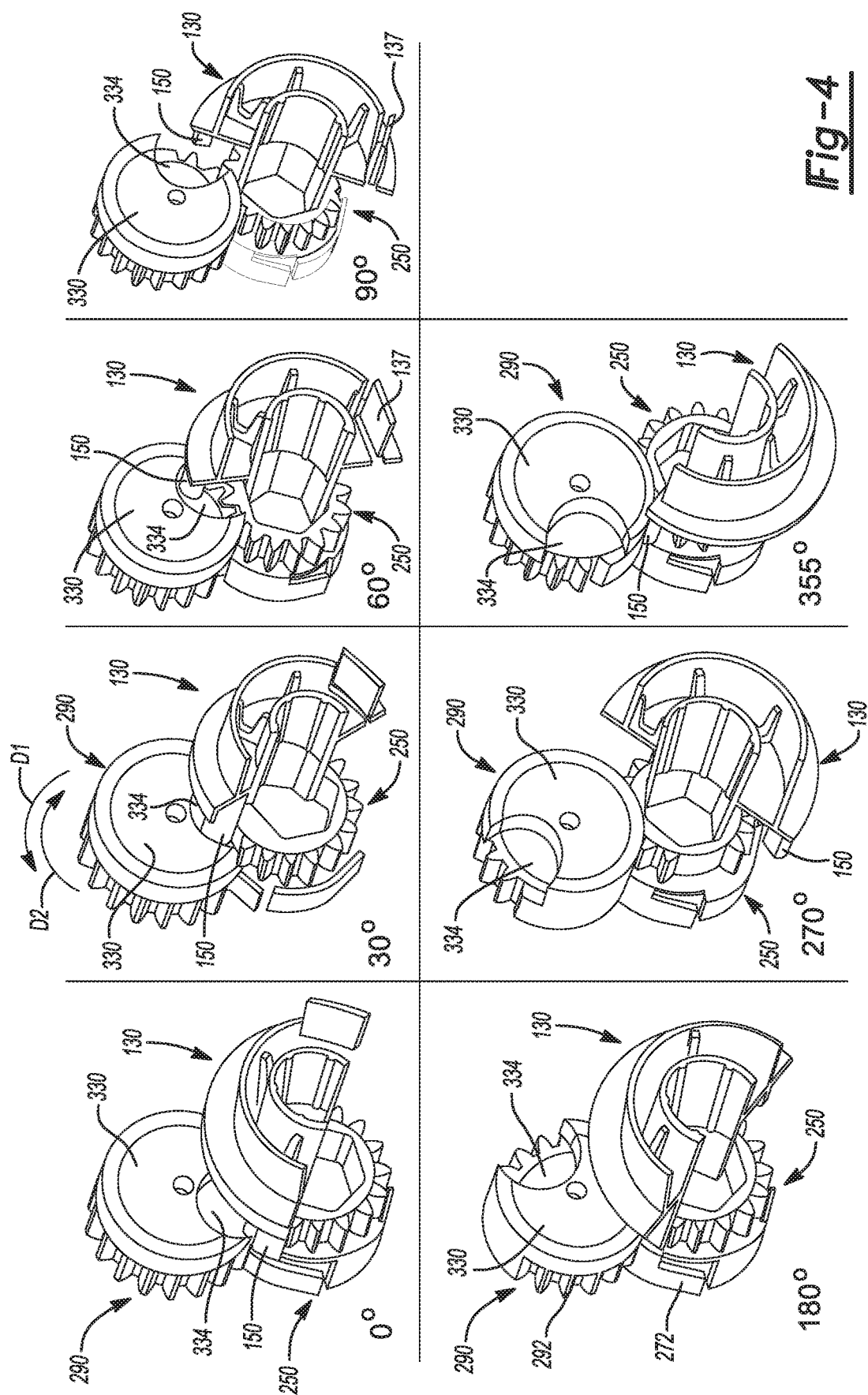
FIG. 4 is a series of perspective views of a set of gears in the actuator of FIG. 2 with the gears in the actuator being shown at angles of 0 degrees, 30 degrees, 60 degrees, 90 degrees, 180 degrees, 270 degrees and 355 degrees of rotation.

The outer knob section 110 may comprise a front wall 112 and a skirt 114 depending therefrom. In some implementations, a set of spaced grooves 116 are defined in at least the skirt 114 so as to enable an easier grasping and rotation of the knob by a shopper. With reference now also to FIG. 3, a hollow cylindrical member or shaft 118 extends in a rearwardly oriented direction centrally from a rear face of the front wall 112. An axial hole 119 is defined in the hollow cylindrical shaft 118. In this way, a free end of a product dispensing coil (such as coil 40 shown in FIG. 1) can be fixedly and non-rotatably attached to the outer knob section 110. A generally circular flange or protrusion 120 extends rearwardly from the rear face of the front wall 112. It is noted that a notch 128 is defined in the inner wall of the generally circular flange at one location. In that location, the inner surface of the flange is not circular and that portion of the inner surface extends tangentially from the remainder of the generally circular inner surface of the flange, thus creating a ratcheting notch. The flange 120 is located radially inwardly of the skirt 114 so as to define an annular space 122. Located in the annular space are a series of spaced reinforcing elements or ribs 124. The flange 120 is located radially outwardly of the shaft 118 so as to define a second annular space 126.

The inner knob section or actuator part 130 may be mounted on the shaft 118. With reference again to FIG. 2, the inner part 130 comprises a base wall 132. An outer generally circular flange or protrusion 134 extends forwardly from the base wall 132. It is noted that an opening 136 is defined in the flange 134 at one location. In that location, a ratcheting flange 137 extends tangentially outwardly from the remainder of the flange and is not connected to the base wall 132. Thus, the flange 137 is relatively flexible in relation to the remainder of the inner knob section 130. Also extending forwardly from the base wall 132 is an inner circular flange 140. Thus, an annular space 142 is defined between the outer generally circular flange 134 and the inner circular flange 140. A plurality of spaced ribs or reinforcing elements 144 are located in the annular space 142.

Extending through the base wall 132 and located inwardly of the inner circular flange is a central opening 146 which can best be seen in FIG. 2. The shaft 118 extends into the central opening 146 as may be best seen in FIG. 5. The generally circular flange 134 of the inner knob section 130 extends into the second annular space 126 of the outer knob 110, with the outer surface of the generally circular flange 134 engaging the inner surface of the generally circular flange 120. When the outer knob 110 is rotated in one direction relative to the inner knob 130, the disconnected tangential portion of the flange 137 engages with the notch 128 of the outer knob causing the outer and inner knob sections 110, 130 to rotate together as if they were a single component. When the outer knob 110 is rotated relative to the inner knob 130 in the opposite direction, the disconnected tangential portion of the flange 137 flexes and does not engage notch 128 causing the outer knob to rotate independently of the inner knob.

With reference now to FIG. 3, extending rearwardly from the rear face of the base wall 132 is a protrusion 150 that is located near an outer periphery of the base wall 132. Extending rearwardly from the rear face of the base wall 132 is a centrally located tube section 154 which has a generally hexagonal outer periphery. The tube section 154 is mounted on a rounded tubular section 156 supported centrally on the rear face of the base wall 132. Defined in the base wall is a slot 158 which is aligned with the flange portion 137 of the outer generally circular flange 134 causing the flange portion 137 to be disconnected from the base wall 132.

With reference again to FIG. 2, the housing 160, on which the knob assembly (e.g., the outer knob section 110 and/or the inner knob section 130) is mounted may comprise a housing front half 170 and a housing rear half 210. The housing front half 170 may include a base wall 172. Defined in the base wall 172 may be an annular recessed area 174 surrounded by a raised area 176. Extending radially inwardly from the recessed annular area 174 may be an annular plateau 178. In other words, the annular recessed area 174 may be defined between the annular plateau 178 and the raised area 176. Defined near an upper end of the raised area 176 may be a window opening 182. Located in the annular recessed area 174 may be a cut out or slot 180. A central opening 184 may extend through the front wall 172 and may be circumscribed by the annular plateau 178. It should be apparent from FIG. 5 that the shaft 118 and tube section 154 extend through the central opening 184.

With reference now again to FIG. 3, the housing front half 170 may further include a recessed housing area 190. Extending axially rearwardly from a rear surface of the base wall 172 may be a pin 192. The pin 192 may be centrally positioned in the recessed housing area 190. Further defined on the rear side of the housing front half 170 may be a generally toroidal raised area 194. The raised area 194 may include a cutout section 195. The cut out section 195 may be located in the area of, or otherwise aligned with, the slot 180 in the base wall 172. Thus, while the recessed housing area 190 is completely circular, the cut out section 195 of the generally toroidal raised area 194 may define in part the circular shape of the recessed housing area 190, or otherwise allow the recessed housing area 190 to be circular. It should also be apparent that the window or opening 182 may be located in the recessed housing area 190 of the base wall 172.

Figure 5:
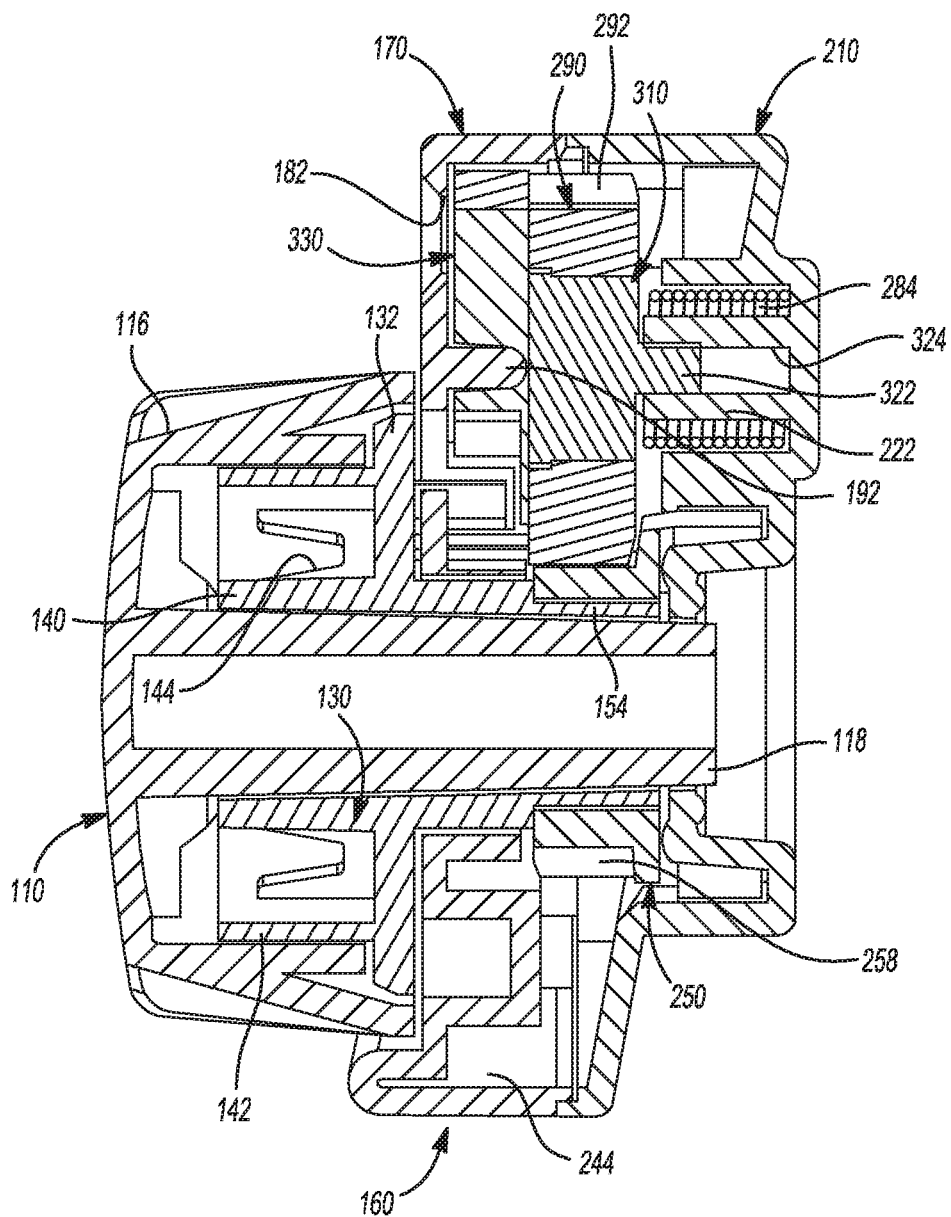
FIG. 5 is an enlarged assembled side elevational view in cross section of the actuator of FIG. 2.

Located radially inwardly of the raised area 194 is an annular recessed area 196. A ring-shaped or toroidal flange 200 may extend rearwardly from the base wall 172 such that the annular recessed area 196 is defined between the ring-shaped flange 200 and the raised area 194. Extending rearwardly from the base wall 172 may be a skirt 202. A series of bosses 204 may also extend rearwardly from the front wall 172. The bosses 204 may be located adjacent the skirt 202. In some implementations, four such bosses 204 are illustrated. FIG. 5 illustrates that the actuator knob inner part 130 mates with the contoured wall section 178 of the housing front half 170 so that the base 156 and hexagonal tube section 154 of the actuator knob inner part 130 extend through the central opening 184 of the housing front half 170.

With reference now again to FIG. 2, cooperating with the housing front half 170 is the housing rear half 210. The housing rear half 210 may comprise a base wall 212 on which is defined an upper recessed area 216 circumscribed by a generally circular rib 218, thus defining an annular space 220. A central protrusion 222 may extend forwardly from the wall 212. An opening or slot 224 may be defined at one location in the rib 218.

Also defined in the rear wall 212 is a lower recessed area 230 including an annular section 232 and a raised ring-shaped central plateau 234. Ratchet surfaces 236 are defined on an outer wall of the recessed area 230. In some implementations, several such ratchet surfaces 236, for example, four, can be defined on the outer face of the wall defining the annular section 232. Extending through the rear wall 212 is a central opening 238. It should be appreciated from FIG. 2 that the central opening 238 may be aligned with the central opening 184 located in the housing front half 170. The housing rear half 210 may also include a skirt 240 and a set of sockets 242. It should be appreciated that the sockets 242 are designed to mate with the bosses 204 extending from the housing front half 170. Thus, the housing halves 170, 210 can be secured to each other in any known manner, such as via the use of fasteners or adhesives, as is known in the art.

The time delay mechanism 280 may be supported within a cavity 244 (FIG. 5) defined by the housing front and rear halves 170 and 210 and may include a first gear 250, a second gear 290, a load spring 284, a rotary damper 310, and a signaling wheel 330. The first gear 250 may include a base wall 252 extending forwardly from which is a ring section 254. Defined on an outer surface 256 of the ring section 254 may be a plurality of aligned teeth 258. The first gear 250 may also include a relatively large curved section 260 located between a pair of the teeth 258. Importantly, the curved section 260 has no teeth. A diameter of the curved section 260 may equal a diameter of a root 261 of the teeth 258. An inner surface 262 of the ring 254 may include a plurality of spaced flat sections 264 so as to define a hexagonally shaped inner periphery for the ring. The hexagonally shaped outer surface of the tube section 154 may be sized and shaped to mate with the hexagonally shaped inner surface 262 of the ring 254. Thus, the first gear 250 may be fixedly engaged with the actuator knob inner part 130 so that rotation of the actuator knob inner part 130 will cause a rotation of the first gear 250 about an axis A1.

With reference now again to FIG. 3, a skirt 270 may depend from the base wall 252. Defined in the skirt 270 may be a plurality of ratchet members or protrusions 272. In some implementations, the skirt 270 may define four spaced planar protrusions 272. The ratchet members 272 of the first gear 250 may be adapted to cooperate with the ratchet surfaces 236 defined on the housing rear half 210.

As is evident from FIG. 2, the load spring 284 may be disposed in the annular space 220 defined in the housing rear half 210 such that a distal end of the spring extends through the opening 224 in the circular rib section 218. A front end or proximal end 286 of the spring may cooperate with, or otherwise engage, a second gear 290.

The second gear 290 may include a plurality of spaced gear teeth 292 extending axially from a rim 294. Defined in one radial section of the second gear 290 is a curved surface 296 where no teeth are present. Thus, only a portion of the rim contains gear teeth.

With reference again to FIG. 3, depending from a rear surface of the second gear 290 is a protrusion 300. Defined in the rear surface is an opening 302 which is spaced from the protrusion 300. It should be appreciated that the spring proximal end 286 is meant to be accommodated in the opening 302 defined in the second gear 290. Also defined in the second gear is a central opening 304.

With reference again to FIG. 2, the rim 294 may extend around, or otherwise define, a recess 305 within the second gear 290. There is provided radially within the rim 294 and the recess 305 a recessed hexagonally shaped area 306. The rim 294 may further define an opening 308 connected to the recess 305. Connected to the second gear is a rotary damper 310. The rotary damper includes a hexagonal base wall 314 which is meant to be engaged by the recessed hexagonal area 306 in the second gear. A circular raised area or protrusion 318 of the rotary damper 310 is accommodated in the second gear central opening 304. Depending from the raised circular area 318 is a stem 322. With reference again to FIG. 5, it can be seen that the stem 322 of the rotary damper 310 is accommodated in a bore 324 of the central protrusion 222 located on the housing rear half 210. Thus, the rotary damper and, hence, the second gear 290 in which the rotary damper 310 is accommodated are coupled to each other and rotate about the stem 322 which is rotationally mounted on the rear housing half 210. In an alternate implementation, it should be appreciated that the rotary damper 310, the housing rear half 210, the second gear 290, and/or the signaling wheel 330 could be formed as one single component from a suitable plastic such as by molding.

The time delay mechanism 280 also comprises the signaling wheel 330 that is non-rotatably attached to the second gear 290. The wheel includes a front face having a semi-circular recessed area 334. Also provided is a central bore 336 that is spaced from the recessed area 334. The central bore 336 cooperates with the pin 192 depending from the housing front half 170 such that the signaling wheel 330 and the second gear 290 are rotatably mounted on the front housing half 170 via the pin 192 and the stem 322 for rotation about an axis A2. The signaling wheel 330 may be disposed within the recess 305 of the second gear 290 such that the recessed area 334 is aligned with the opening 308.

In some implementations, the front face of the signaling wheel 330 and the second gear 290 has a first color, such as red in a first section, as well as a second color, such as green in a second section. The second color green is located such that it is only visible through the window 182 when the second gear 290 has returned to its home position. In this way, a shopper can see through window 182 whether the actuator mechanism is able to rotate the coil to which it is attached, via the coil being attached to the opening in the shaft 118, such as when the color green is shown through the window 182, or is prevented from rotating the coil, such as when the color red is shown by the signaling wheel. It should be appreciated that protrusion 150 of the knob inner part engages in and cooperates with recessed area 334 of the signaling wheel 330, and the opening 308 of the second gear 290, through the slot 180 defined in the front housing half 170.

In some implementations, it can be appreciated that the outer knob 110 is able to turn in two opposing directions: clockwise and counterclockwise. When a product dispensing coil is fixedly and non-rotatably attached to the outer knob 110, a full clockwise rotation of the outer knob will dispense a single product. A full counter-clockwise rotation or the outer knob 110 will allow product to be loaded onto the peg hook. When turned in the product dispensing direction (clockwise), the outer knob 110 is operationally engaged with the inner knob 130 by way of the ratcheting notch 128 and ratcheting flange 137. When turned in the opposite direction (counter-clockwise), the outer knob 110 is free to rotate independently of the inner knob 130, thus bypassing the time delay mechanism 280.

Further describing the function of the invention in this implementation, when the outer knob 110 is turned in the dispensing direction (clockwise) about the axis A1, the inner knob 130 is operationally engaged by the outer knob 110 and the first gear 250 is turned by means of the hex drive interface 154, 264. Shortly after rotation of the first gear about the axis A1, the protrusion 150 of the inner knob enters the semi-circular recessed area 334 of the time delay mechanism 280 and the first tooth of the first gear 250 engages the first tooth of the second gear 290 causing the second gear 290 to rotate in a direction D1 about the axis A2. This is shown in the 0 degree and 30 degree illustrations of FIG. 4. It should be noted that there is a single unique position that allows entry of the protrusion 150 into the semi-circular recessed area 334 and into the opening 308 of the second gear 290; all other positions of the time delay mechanism prevent entry of the protrusion 150. As the engaged teeth of the first gear, rotating in the clockwise direction, cause a counter-clockwise rotation in the second gear 290, the protrusion 150 continues passing through the semi-circular recessed area 334. This is shown in illustrations 60 degree and 90 degree of FIG. 4. As rotation of the first gear continues, counter-rotation of the second gear continues and potential energy is stored in the torsion spring 284. This is shown in illustrations ISO degree and 270 degree of FIG. 4. When an approximately 355 degree clockwise rotation of the first gear has occurred, further rotation is prevented by the protrusion 150 being blocked from entry into the semi-circular recessed area 334. Additionally, further rotation of the second gear is prevented by protrusion 300 coming into contact with the rear housing half 210. See illustration 355 degree of FIG. 4. At this same time, namely at approximately 355 degrees of first gear rotation, the lack of teeth on the first gear (e.g., section 2606 and/or the ink of teeth on the second gear (e.g., curved surface 296) cause the second gear to become rotationally disengaged from the first gear and the stored energy of the torsion spring biases the second gear in another direction D2 back to its original position. The rotary damper controls the rate at which the second gear returns to its original position, thus causing a time delay during which the outer knob remains unable to rotate in a clockwise, dispensing direction. It is only after the second gear has returned to its original position that the outer knob can once again be turned to dispense another product.

In some implementations, the housing halves 170 and 210, as well as the components held therein, other than the spring 284, can be made of a suitable conventional plastic material. So, too, can the outer and inner knob sections 110 and 130. Of course, other known materials could be employed instead, if so desired.

In the time delay mechanism disclosed herein, two gears interface with each other, but the lack of teeth on the first and second gears means there is some slippage between the first and second gears so that a movement of the consumer accessible actuator knob 110 does not necessarily cause a movement of the coil which extends around the support rod on which merchandise is hung.

While the time delay actuator has been described in connection with a rotating knob, it should be appreciated that the same type of time delay mechanism can be provided for a linear actuator, such as a lever or the like.

The disclosure has been described with reference to one particular embodiment. Obviously, modifications and alterations will occur to others upon the reading and understanding of this specification. It is intended to include all such modifications and alterations insofar as they come within the scope of the appended claims or the equivalents thereof.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A product-dispensing device comprising:
    a housing;
    a first knob supported by the housing for rotation about a first axis, the first knob including a protrusion;
    a first gear coupled to the first knob;
    a second gear supported by the housing for rotation about a second axis and configured to engage the first gear, the second gear including a rim defining a peripheral opening; and
    a biasing member supported by the housing and operable to rotate the second gear in a first direction about the second axis,
    wherein the protrusion is configured to engage the rim in a first mode of operation and wherein the peripheral opening is configured to receive the protrusion in a second mode of operation.

2. The device of claim 1, further comprising a second knob supported by the first knob, the second knob operable to rotate with the first knob in a second direction about the first axis and operable to rotate independently of the first knob in the first direction about the first axis, the second direction being opposite the first direction.

3. The device of claim 2, further comprising a product dispensing coil coupled to the second knob for rotation therewith.

4. The device of claim 2, wherein the second knob includes a flange, and the first knob includes a notch configured to receive the flange upon rotation of the second knob about the first axis.

5. The device of claim 1, wherein the rim is operable to prevent rotation of the first knob about the first axis in the first mode of operation.

6. The device of claim 1, wherein the biasing member is operable to store potential energy upon rotation of the second gear in a second direction about the second axis.

7. The device of claim 1, further comprising:
    a damper supported by the housing and operable to control a rate of rotation of the second gear in the first direction about the second axis; and
    a signaling wheel supported by the second gear for rotation about the second axis and defining a recessed area aligned with the opening.

8. The device of claim 7, wherein the housing includes a first side defining an annular recess operable to translatably receive the protrusion, and a second side defining a recessed housing area operable to rotatably receive the signaling wheel, and wherein the annular recess defines a slot aligned with the opening of the second gear and the recessed area of the signaling wheel.

9. A product-dispensing device comprising:
    a housing;
    a first gear supported by the housing for rotation about a first axis;
    a product dispensing coil operably coupled to the first gear for rotation about the first axis;
    a second gear operable to engage the first gear, the second gear supported by the housing for rotation about a second axis offset from the first axis, the second gear defining an opening offset from the second axis;
    a biasing member operable to bias the second gear in a first direction about the second axis; and
    a first knob coupled to the first gear for rotation about the first axis, the first knob including a protrusion offset from the first axis and disposed within the opening in a first mode of operation.

10. The device of claim 9, wherein the first gear is operable to rotate the second gear in a second direction about the second axis.

11. The device of claim 10, further comprising a second knob operable to rotate with the first gear in the first direction about the first axis and operable to rotate independently of the first gear in the second direction about the first axis.

12. The device of claim 9, wherein the second gear includes a rim radially offset from the second axis, the protrusion operable to engage the rim to prevent rotation of the first knob about the first axis in a second mode of operation.

13. The device of claim 9, further comprising:
    a damper supported by the housing and operable to control a rate of rotation of the second gear in the first direction about the second axis; and
    a signaling wheel supported by the second gear for rotation about the second axis and defining a slot aligned with the opening and configured to receive the protrusion in the first mode of operation.

14. The device of claim 13, wherein the housing includes a first side defining an annular recess operable to translatably receive the protrusion, and a second side defining a recessed housing area operable to rotatably receive the signaling wheel.

15. The device of claim 9, wherein the biasing member is operable to store potential energy upon rotation of the second gear in the second direction about the second axis.

16. A product-dispensing device comprising:
    a housing;
    a first knob supported by the housing for rotation about a first axis, the first knob including a protrusion;
    a first gear coupled to the first knob for rotation about the first axis, the first gear including a first plurality of gear teeth;
    a second gear coupled to the housing for rotation about a second axis, the second gear including a second plurality of gear teeth and a rim axially offset from the second plurality of gear teeth, the second plurality of gear teeth configured to engage the first plurality of gear teeth; and a biasing member coupled to the second gear and configured to rotate the second gear in a first direction about the second axis, wherein the protrusion is operable to engage the rim to prevent rotation of the first knob about the first axis in a first mode of operation.

17. The device of claim 16, further comprising a damper operably coupled to the second gear and configured to control a rate of rotation of the second gear in the first direction about the second axis.

18. The device of claim 16, further comprising a product dispensing coil operably coupled to the first gear for rotation about the first axis.

19. The device of claim 16, wherein the first gear includes a first arcuate peripheral wall extending between a first pair of gear teeth, and the second gear includes a second arcuate peripheral wall extending between a second pair of gear teeth, and wherein the second gear is operable to rotate independently of the first gear when the first arcuate peripheral wall is aligned with the second arcuate peripheral wall.

20. The device of claim 16, wherein the rim defines an opening configured to receive the protrusion in a second mode of operation.

* * * * *